(12) United States Patent
Casco-Arias Sanchez et al.

(10) Patent No.: US 8,918,425 B2
(45) Date of Patent: Dec. 23, 2014

(54) ROLE ENGINEERING SCOPING AND MANAGEMENT

(75) Inventors: Luis B. Casco-Arias Sanchez, Austin, TX (US); Todd D. Jordan, Raleigh, NC (US); David G. Kuehr-McLaren, Apex, NC (US); Oriana J. Love, Richland, WA (US); David W. Palmieri, Cary, NC (US); Chrystian L. Plachco, Morrisville, NC (US); Magesh Rajamani, Pune (IN); Jeffrey T. Robke, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 13/278,441

(22) Filed: Oct. 21, 2011

(65) Prior Publication Data

US 2013/0104046 A1  Apr. 25, 2013

(51) Int. Cl.
*G06F 17/30* (2006.01)
*H04L 29/06* (2006.01)
*G06Q 10/06* (2012.01)
*G06F 21/60* (2013.01)

(52) U.S. Cl.
CPC ............... *H04L 63/20* (2013.01); *G06Q 10/06* (2013.01); *G06F 21/604* (2013.01)
USPC ...................................................... 707/784

(58) Field of Classification Search
CPC ............ G06F 21/6227; G06F 21/6218; G06F 21/30864
USPC ......................................... 707/783, 784, 787
See application file for complete search history.

(56) References Cited

U.S. PATENT DOCUMENTS

| | | | | |
|---|---|---|---|---|
| 6,182,142 | B1* | 1/2001 | Win et al. | 709/229 |
| 7,650,633 | B2* | 1/2010 | Whitson | 726/6 |
| 8,042,158 | B2* | 10/2011 | Larsen | 726/4 |
| 8,549,289 | B2* | 10/2013 | Grebenik et al. | 713/166 |
| 2002/0178119 | A1* | 11/2002 | Griffin et al. | 705/54 |

(Continued)

FOREIGN PATENT DOCUMENTS

| CN | 1537262 A | 10/2004 |
|---|---|---|
| CN | 102156833 A | 8/2011 |

OTHER PUBLICATIONS

U.S. Appl. No. 13/803,010.

(Continued)

*Primary Examiner* — Rehana Perveen
*Assistant Examiner* — Loc Tran
(74) *Attorney, Agent, or Firm* — Stephen J. Walder, Jr.; Jeffrey S. LaBaw

(57) ABSTRACT

Mechanisms are provided for performing a role engineering project for applying security roles to access operations targeting resources. A plurality of data objects representing one or more user identities, permissions, and resources of an organization computing system are received. One or more filter criteria for filtering the plurality of data objects to generate a subset of data objects for consideration during the role engineering project are received. The one or more filter criteria specify a scope of the role engineering project. The one or more filter criteria are applied to generate the subset of data objects. Role engineering project operations are performed on the subset of data objects to generate one or more security roles. The one or more security roles are deployed to the organization computing system to control access operations targeting resources of the organization computing system.

16 Claims, 9 Drawing Sheets

(56) References Cited

U.S. PATENT DOCUMENTS

| | | |
|---|---|---|
| 2005/0114829 A1 | 5/2005 | Robin et al. |
| 2006/0218394 A1* | 9/2006 | Yang .......................... 713/167 |
| 2007/0283443 A1 | 12/2007 | McPherson et al. |
| 2008/0168063 A1* | 7/2008 | Whitson .......................... 707/9 |
| 2009/0043621 A1 | 2/2009 | Kershaw |
| 2010/0325684 A1 | 12/2010 | Grebenik et al. |
| 2010/0325724 A1 | 12/2010 | Grebenik et al. |
| 2011/0184771 A1 | 7/2011 | Wells |

OTHER PUBLICATIONS

International Search Report and Written Opinion dated Jan. 24, 2013 for International Application No. PCT/CN2012/083051, 11 pages.

* cited by examiner

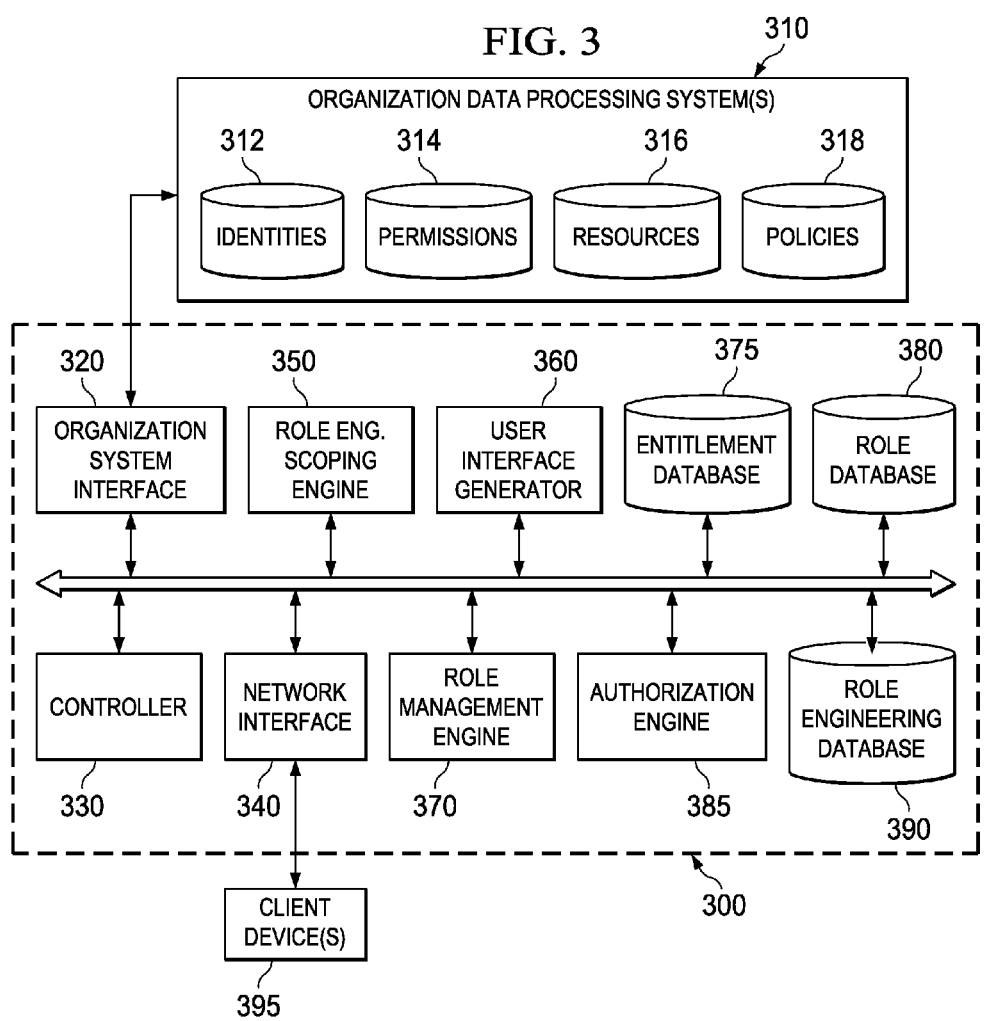

ROLE ENGINEERING SCOPING AND MANAGEMENT

BACKGROUND

The present application relates generally to an improved data processing apparatus and method and more specifically to mechanisms for role engineering scoping and management.

In the area of security role management, role modeling is used to create an efficient and manageable set of security roles that meet the business goals of protecting resources while granting access to the correct people associated with the business organization. With large scale organizations, the number of people in the organization, e.g., thousands or 100s of thousands, the number of permissions guarding the resources, e.g., thousands or even millions, and the number of mappings between users and permissions, e.g., thousands or even 10s of millions, needed to run the organization is beyond a management scope of the system administrators designing the security roles.

Many security role engineering projects fail because of the many months or years it takes to deal with the large data sets representing the number of people, resources, and permissions of an organization. This becomes even more time consuming when having to collaborate across multiple organizations. By the time the security roles are developed, much of the data regarding the people, resources, and permissions may have changed such that the security roles developed are stale and no longer completely relevant to the business goals of the organization.

SUMMARY

In one illustrative embodiment, a method, in a data processing system, is provided for performing a role engineering project for applying security roles to access operations targeting resources. The method comprises receiving, by the data processing system, a plurality of data objects representing one or more user identities, permissions, and resources of an organization computing system. The method further comprises receiving, by the data processing system, one or more filter criteria for filtering the plurality of data objects to generate a subset of data objects for consideration during the role engineering project. The one or more filter criteria specify a scope of the role engineering project. Moreover, the method comprises applying, by the data processing system, the one or more filter criteria to generate the subset of data objects. In addition, the method comprises performing, in the data processing system, role engineering project operations on the subset of data objects to generate one or more security roles. The method also comprises deploying, by the data processing system, the one or more security roles to the organization computing system to control access operations targeting resources of the organization computing system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an example diagram illustrating the primary operational components of a role engineering mechanism in accordance with one illustrative embodiment;

DETAILED DESCRIPTION

Figure 1:
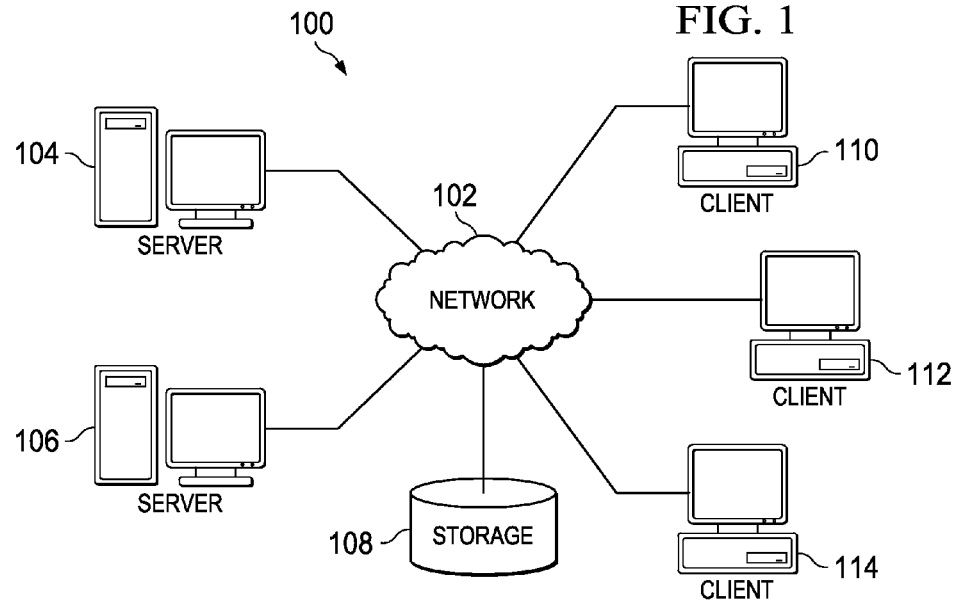
FIG. 1 is an example block diagram of an example distributed data processing system in which aspects of the illustrative embodiments may be implemented.

The illustrative embodiments provide a mechanism for role engineering scoping and management. The term "role engineering scoping" as it is used herein refers to defining a range of data objects for consideration during a role engineering project comprising one or more subsets of the particular data that will be the basis for the role engineering/modeling and development. The term "role" as it is used herein refers to a data structure having a set of one or more permissions identifying the resources that may be accessed (i.e. an action affecting a resource) by an entity or entities to which the role is assigned, what types of access the entity may perform, the results that may be returned to the entity as a result of the access operations to be performed on such accesses, e.g., creating, retrieving, updating, filtering, transformation, or the like, operations to be performed in response to such accesses, e.g., sending notifications to administrators, and the like. The entity may be a human user, a computing device resource, or the like. A role is a concept that aggregates users and permissions, with a relevant meaning to the organization, such as job function or position, to simplify the management of user access to resources. Through an assignment to one or more roles, a user acquires the permissions to perform operations on resources, where those permissions are also assigned to the roles. Using roles, management of a user's access to resources is simplified to the assignment of the user to roles.

A permission is essentially a rule having one or more criteria, where the criteria of the rule identifies conditions under which accesses may be allowed or denied to the entity with which the role is assigned. A permission defines an action that can or cannot be performed on a particular resource, e.g., David has write access to the patient record, or Kim has read access to patient hours when working remotely. A policy connects entities to permissions with additional constraints, e.g., a policy may be of the type that a person cannot be granted both the permissions to bill patients and to receive payments, or a person cannot be in both the Doctor role and Malpractice Investigator role. A role may be used in a policy, such as people in the Nurse role have write access to patient records.

The illustrative embodiments provide mechanism that utilize the business context of resources, permissions, policies, roles, and identities of users to perform role engineering scoping so that a role engineering project, i.e. a project for defining roles and applying them to various users and resources for implementing security policies of an organization, may be focused on a more meaningful and manageable set of resources, identities, permissions and policies. The "business context" refers to the sets of attributes or parameters associated with and defining the resources, permissions, policies, roles, and identities of users, of the organization.

The role engineering scoping mechanisms of the illustrative embodiments allow a user to customize the creation of one or more filters for selecting the particular resources, permissions, policies, roles, and identities that are significant to the particular role engineering project the user is engaged in. The user may specify these one or more filters as sets of one or more attributes and parameters of the business context of the resources, permissions, policies, roles, and identities that are of importance to the user's role engineering project. The result is a finite set of related resources, permissions, policies, roles, and identities to define a more narrow scope of identities and accesses that are important to model and define a scope of what users, resources, roles, and permissions are most critical to begin a role engineering project.

The role engineering scoping mechanisms of the illustrative embodiments further provide mechanisms for providing user interfaces and underlying logic to change the scope of a role engineering project in increments, e.g., increasing/decreasing the number of users and/or increasing/decreasing the number of permissions. Narrower scope role engineering projects may be independently performed using the scoping mechanisms of the illustrative embodiments and then later aggregated so that the results of these separately and independently performed role engineering projects can form a RBAC system for an organization. Mechanisms are further provided to allow role engineering projects to inherit scope from other role engineering projects as a way to sub-divide the role engineering effort of a large organization or large number of permissions into manageable units.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
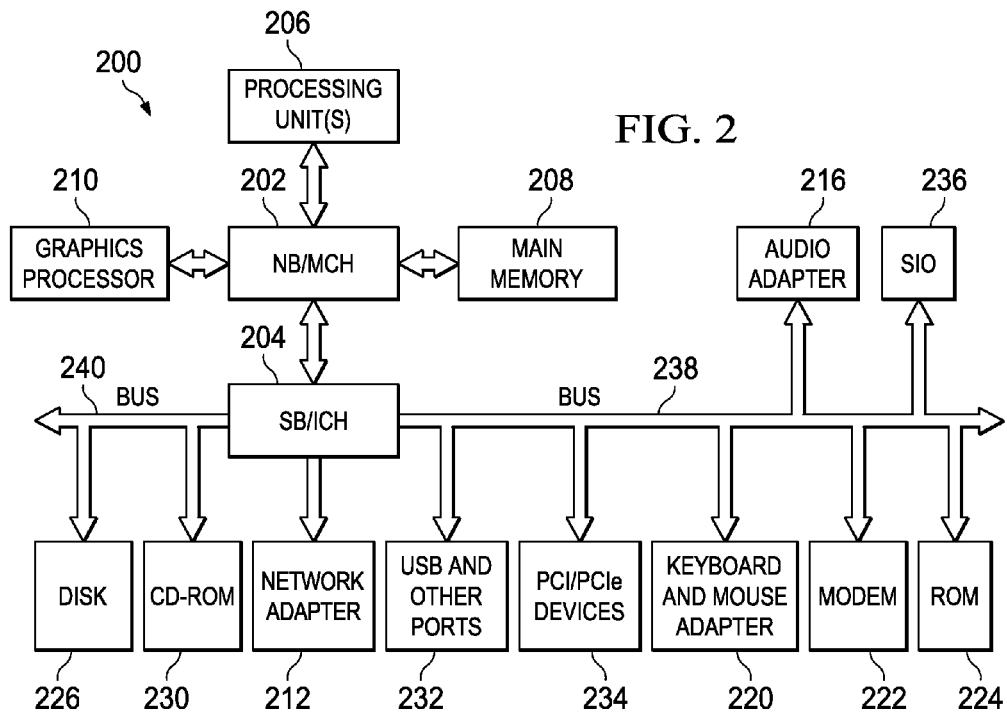
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With the mechanisms of the illustrative embodiments, one or more of the servers 104 or 106 may provide role management mechanism that is accessible by one or more client computing devices, e.g., clients 110, 112, and/or 114, administrator workstations, or the like, for the purpose of creating/defining roles or performing role management. The roles specify a mapping of permissions for accessing resources of an organizations' data processing system(s) with the various resources of the data processing system(s) and users of the data processing system(s). For example, roles may be defined for any organization purpose that meets with the goals of the organization. For example, roles may be associated with departments of an organization, individual types of employees within the departments, types of resources, or the like. If an organization is a hospital, then roles may be associated with an emergency room department of the hospital, administration personnel of the hospital, physicians, nurses, pharmacy personnel, hospital technicians, or the like.

In accordance with the illustrative embodiments, the role management mechanism further implements a role engineering scoping mechanism. The role management mechanism and the role engineering scoping mechanism may operate on a repository of data, such as may be provided in association with the servers 104, 106, in a network attached storage device/system such as storage unit 108 or the like, or otherwise made accessible to the servers 104, 106. The repository stores one or more database data structures, table data structures, objects, or the like, for defining resources, permissions, policies, roles, and identities of users, of the organization. These database data structures, table data structures, objects, or the like comprise one or more attributes/parameters for defining the business context of these entities. The role engineering scoping mechanism may operate on these attributes/parameters for defining filters and the like, for specifying a scope, which comprises a subset of data corresponding to a narrower scope than the entire set of data representing all of the resources, permissions, policies, roles and identities of users, of the organization. User interfaces are provided for presenting data to the user and allowing the user to specifying such narrower scope in terms of the attributes/parameters that are important to the particular role engineering project the user is engaged in. Furthermore mechanisms are provided for operating on this narrower scope to achieve the role engineering, e.g., defining, applying, and managing roles to particular users and resources of the organizations' data processing system(s).

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

The data processing system 200 may execute one or more software programs for providing role engineering and role engineering scoping in accordance with the illustrative embodiments. For example, the one or more software programs may be distributed on one or more computer readable media, downloaded from data processing system via one or more data networks, or the like, and stored on one or more local storage devices, such as hard drives, flash drives, solid state drives, or the like. Moreover, the one or more software programs may be loaded into the main memory 208 of the data processing system 200 so that the one or more processing units 206 may execute the software programs to perform the various operations and implement the various components of the illustrative embodiments as described in greater detail hereafter.

The ability to scope a role engineering project is based on the utilization of attributes describing the resources, permissions, policies, and identities that provide additional context to these elements of an organization's computing system. These elements may be defined by data structures in one or more data storage systems of an organization, e.g., human resources computing and storage systems, security computing and storage systems, resource management computing and storage systems, or the like. These data structures may be database records, data objects, or other collections of data. For purposes of the present description, these data structures will be referred to herein as data objects.

These data objects may represent user identities, permissions, policies, computing system resources, and the like, and define these entities in terms of one or more context attributes. For example, a user identity data object may comprise various context attributes including name, department(s) within the organization that the user is associated with, a particular job code or other designation for the user, security access level of the user, contact information for the user, a location of the organization with which the user is associated, social communities the user is associated with, networks the user utilizes, and the like. A resource data object may specify, for example, context attributes such as a type of the resource, a location of the resource, a department of the organization with which the resource is associated, a security access level of the resource, criticality identifier of the resource, and the like. Permission data objects may specify, for example, context attributes such as the type of permission, policies associated with the permission, operations that may be performed, associated applications, risk sensitivity of associated objects, etc. Mappings or relationships between user identities and permissions, policies, and resources may be generated using these objects along with specifying usage constraints (such as separate of duty, time of day, device used to access, or the like) via the context attributes. The context attributes may be of a business function nature (e.g., location, job code, department, owner, organization, approval/access limits, etc.), business policy related (e.g., regulatory compliance, risk score, classification, separation of duty, etc.), information technology related (e.g., server, database table, physical location, system owner, etc.), or other context types that are important to the organization. These context attributes may be automatically populated or manually populated in the organization's computing system in a manner generally known in the art.

The mechanisms of the illustrative embodiments allow a user to define a scope of a role engineering project based on a subset of these context attributes which in turn define a subset of data objects of an organization's computing system that is less than the total number of data objects maintained by the organizations computing system for purposes of role enforcement on access requests between users and resources, resources and other resources, or the like. By limiting the scope of the data objects under consideration during the role engineering project, the role engineering project becomes more manageable such that the role engineering project can be completed more quickly, thereby avoiding the problems associated with present role engineering projects taking large amounts of time to complete such that the resulting roles generated by the role engineering projects become stale and no longer completely relevant to the current state of the organizations' computing systems.

Moreover, multiple role engineering projects may be performed at substantially a same time or may be performed independent of one another. The results of these independent role engineering projects may then be integrated with one another in the organization's resource management and/or security role management systems so as to be applicable to access requests from users targeting resources, or resources targeting other resources, within the organization's computing system(s). Thus, multiple role engineering project analysts may work on different parts of an organization and its associated roles.

This independent role engineering projects and scoping of the role engineering projects allows an organization to prioritize role engineering projects according to their organization's concerns. That is, prior to the mechanisms of the illustrative embodiments, role engineering projects were performed on the entire set of data objects handled by the organization and no tools were provided for narrowing the scope of these role engineering projects. Thus, one could not simply concentrate efforts of role engineering to areas of the organization that were most important to the organizations' concerns at the time. With the mechanisms of the illustrative embodiments, the scope of a role engineering project may be narrowed to focus on only those data objects that are associated with a particular concern of the organization at the time. For example, if an organization determines that, at the present time, they need to concentrate a role engineering project on the emergency room department of the organization with regard to patient records access, the mechanisms of the illustrative embodiments allow a role engineering project analyst to define the scope of the role engineering project and the data objects being considered such that only those data objects representing user identities, permissions, policies, and resource objects that are associated with the emergency room department and patient records. Thus, the role engineering scoping performed by the mechanisms of the illustrative embodiments may be based on organization priorities.

With the mechanisms of the illustrative embodiments, upon starting a role engineering project for defining roles for controlling access to resources, the role engineering project analyst may define a role engineering project and specify the context attributes that are of importance to the role engineering project. The specification of the context attributes may be performed via one or more user interfaces that display or otherwise output the context attributes associated with various ones of the data objects that may be potentially included in the role engineering project. For example, the context attributes of a user identity data object may be displayed and the analyst may choose which context attributes to use as filter criteria for identifying which user identity data objects are to be included as being considered for defining and applying roles as part of the role engineering project. Similar displays and selection interfaces may be provided for other types of data objects including permission data objects, resource data objects, policy data objects, and the like. Furthermore, the interfaces of the illustrative embodiments may be used to update and create new context attributes for data objects to further enhance the accuracy of the role engineering scoping being performed.

Thus, based on the context attributes, the analyst is able to select a subset of user identifier data objects, permissions data objects, policies data objects, resource data objects, and the like, such that the subset of data objects of the organization's computing system(s) are selected for consideration which is more manageable than applying the role engineering project to all of the data objects maintained by the organization's computing system(s). This subset of data objects serves as the basis upon which the analyst may perform role creation operations via a role engineering tool. For example, the analyst may select user identity data objects, resource data objects, and policies and permission data objects to correlate into a defined role. Furthermore, the analyst may edit or modify instances of these data objects to make them customized or specific to the analyst's desired role functionality. The actual process of role creation may utilize existing methods and mechanisms of role engineering, such as data mining, applied to the subset of data objects identified using the mechanisms of the illustrative embodiments, to produce roles targeted at the subset of data objects identified using the mechanisms of the illustrative embodiments.

For example, a role engineering project analyst may determine that, for a particular role engineering project, the user identity attributes of "manager," "organization," "job code," "location," and "training certification level" are the context attributes that are most likely to correlate to organization roles of importance to the role engineering project. The analyst may specify certain values for each of these context attributes that are of importance to the defining of the roles as part of the role engineering project. The analyst may further determine that it is most important to demonstrate controls over applications that are government regulated, such as Health Insurance Privacy and Portability Act (HIPPA) for medical applications, and Sarbanes-Oxley (SOX) for financial applications and thus, may specify a set of one or more context attribute values representative of such government regulated applications, e.g., application type of HIPPA, SOX, or the like. Furthermore, the organization may have scored the risk of applications as high, medium, and low and the analyst may specify that he/she is only interested in applications that have a medium or high risk score.

The designation of these context attributes is used as a filter that is applied against the data objects of the organization's computing system(s) to retrieve only those user identity data objects having associated context attributes that match those selected by the analyst. As a result, a subset of data objects, which defines the scope of the role engineering project, is retrieved and displayed via the analysts computing device for use with a role engineering tool. The analyst may then perform role creation, management, and application operations on the subset of data objects.

FIG. 3 is an example diagram illustrating the primary operational components of a role engineering mechanism in accordance with one illustrative embodiment. The components of the role engineering mechanism may be implemented as software executed on underlying hardware, hardware itself, or any combination of software and hardware. That is, the components of the role engineering mechanism 300, in one illustrative embodiment, may be distributed as a suite of software applications, modules, or the like, which are then installed on one or more data processing systems which execute the software applications to perform the various operations and functionality described herein. In other illustrative embodiments, one or more hardware devices, such as firmware devices, application specific integrated circuits (ASICs), or the like, may be provided to perform the operations and functionality of one or more of the components shown in FIG. 3. Furthermore, a combination of such approaches may also be utilized.

As shown in FIG. 3, the role engineering mechanism 300 of the illustrative embodiments obtains input data from one or more organization data processing systems 310. These one or more organization data processing systems 310 may be, for example, databases maintained or otherwise utilized by the organization to store data objects representative of personnel, resources, policies, permissions, and the like, that the organization uses in its management of use of computing resources within the organization. For example, in the depicted example, the organization data processing systems 310 comprise a user identities database 312, a permissions database 314, a resources database 316, and a policy 318 database. These databases 312-318 may be stored as part of a single organization computing system or may be distributed across two or more of the organization's computing systems. Any configuration may be utilized without departing from the spirit and scope of the illustrative embodiments as long as the role engineering mechanism 300 is able to access the data objects stored in these databases for purposes of performing role engineering operations.

The role engineering mechanism 300 includes an organization system interface 320, a controller 330, a network interface 340, a role engineering scoping engine 350, a user interface generator 360, a role management engine 370, an entitlement database 375, a role database 380, an authorization engine 385, and a role engineering project database 390. The controller 330 controls the overall operation of the role engineering mechanism 300 and orchestrates the operation of the other elements 320 and 340-390. The organization system interface 320 provides a data communication interface through which data objects and the like may be accessed from the organization data processing system(s). The network interface 340 provides a data communication interface through which the role engineering mechanism 300 may provide data to, and receive input from, one or more client computing devices 395, other server computing devices, and the like, via one or more data networks (not shown). While FIG. 3 shows the interfaces 320 and 340 being separate interfaces, it should be appreciated that these interfaces may be combined such that both the organization data processing system(s) and the client computing devices, servers, etc. 395 may be accessed via a same data interface, e.g., via one or more data networks.

The role engineering scoping engine 340, in conjunction with the user interface generator 360 presents graphical user interfaces to a user of a client device 395 for the selection of context attributes of interest to the user when initiating a role engineering project. Based on the user's input of context attributes for various types of data objects, e.g., user identity data objects, permissions data objects, resources data objects, and policy data objects, the role engineering scoping engine 350 operates to retrieve and display, via one or more graphical user interfaces generated by the user interface generator 360, data objects from the organization data processing system(s) 310 that have the context attributes specified and the particular values of these context attributes specified by the user (if any).

The resulting subset of data objects from the organization data processing system(s) databases 312-318 are displayed to the user via the client device 395 within the context of the role engineering project created by the user. Information about the role engineering project may be stored in one or more records in the role engineering project database 390 such that it may be retrieved at a later time to continue role engineering operations under the role engineering project. The user interface(s) presented to the user via the client device 395 may be used along with role management engine 370 to define roles for use with the organization data processing system(s) 310. The creation of these roles may take many different forms depending upon the particular implementation. In one illustrative embodiment, from the subset of user identity data objects, permissions data objects, resources data objects, and policies data objects identified by the role engineering scoping engine 350 that are within the scope of the role engineering project as defined by the user through the selection of context attributes and corresponding values of the context attributes, a user may specify particular permissions and policies that are to be applied to particular user identities and resources of the organization data processing system(s) 310. The user may further customize the criteria or values used by these permissions and policies when applied to the particular user identities and resources. As noted above, existing methods and mechanisms of role engineering, such as data mining, may be applied to the data objects identified using the mechanisms of the illustrative embodiments to assist in the generation of roles targeted at these data objects.

In this way, the user may define a role within the organization data processing system(s) and store that role, which specifies the associations of user identities, permissions, resources, and policies, in a role database 380. These roles may later be deployed to the organization data processing system(s) 310 and utilized by resource management systems, security systems, authorization engine 385, and the like, to control access operations being performed between users and resources, resources and other resources, or the like, either entirely within the organization data processing system 310 or between the organization data processing system(s) 310 and other computing devices and users external to the organization data processing system(s) 310. The actual deployment of the roles may comprise compiling the roles into a representation that is useable with the particular environment in which the roles are to be implemented. For example, an XML representation of the roles, filters, and resulting data objects may be generated and imported into a system that uses roles for authorization. The filters may be used during deployment to determine where the roles should be applied in the target system, for example.

In one illustrative embodiment, the actual mapping of permissions, user identities, resources, and policies may be performed using entitlement database 375 which aggregate data from a multiple sources and may store the mappings or associations of the permissions, user identities, resources, and policies for use in controlling access to resources by particular user identities in accordance with the permissions and policies associated with these objects. The authorization engine 385 may be used to enforce these mappings or associations.

It should be appreciated that the role engineering mechanism 300 permits re-scoping of a role engineering project after the initial designation of context attributes of interest to the user. That is, the user may be provided with graphical user interfaces for modifying the scope of the role engineering project by modifying the set of context attributes that are of interest to the user during the performance of the role engineering project. Thus, the user may specify an initial set of context attributes with regard to various data objects and, in the process of performing the role engineering project, determine that this scope is either too narrow or too broad and may modify the set of context attributes or interest or the values associated with these context attributes that are to be considered. This allows for an iterative approach to role engineering.

In one illustrative embodiment, to perform such re-scoping of the role engineering project, filters defined based on the selected context attributes can be added, modified, or deleted from the role engineering project definition, thereby changing the scope and project. As a result of filter context attribute changes, existing analysis and statistics are adjusted to reflect the new, deleted, and modified set of data objects identified by the filter context attribute changes. The ability to change the filter context attributes, and the resulting changes to the data objects being included in the role engineering project, allows the role analysts to expand a role engineering project and/or react to organizational changes, such as a reorganization or new company acquisition.

Thus, the illustrative embodiments provide mechanisms for role engineering scoping in which context attributes of interest to a role engineering project analyst may be selected via a user interface and used as a basis for selecting data objects that are to be included for consideration during the performance of the role engineering project. This greatly reduces the complexity of the role engineering project and allows the role engineering project to be performed more efficiently and independently of other role engineering projects associated with the same organization. This further allows an organization to focus role engineering efforts on areas of the organization based on a prioritization of areas of the organization on which the organization wishes to have role engineering performed.

To further illustrate a manner by which the mechanisms of the illustrative embodiments may operate, FIGS. 4A-4F are provided as example diagrams of user interfaces that may be generated by the various components of the role engineering mechanisms for defining a scope for role engineering/modeling in accordance with one illustrative embodiment. The user interfaces shown in FIGS. 4A-4F may be generated by a user interface generator 360 in conjunction with the functionality of the role engineering scoping engine 350 in FIG. 3, for example. FIGS. 4A-4F will be described in the context of an example role engineering project which is only intended to be an example and is not intended to be limiting to the applicability of the mechanisms of the illustrative embodiments. Moreover, the depictions in FIGS. 4A-4F are only exemplary and not intended to be limiting on the particular types of user interfaces, their organization, or even their content with regard to the various possible implementations of the illustrative embodiments.

Figure 4A:
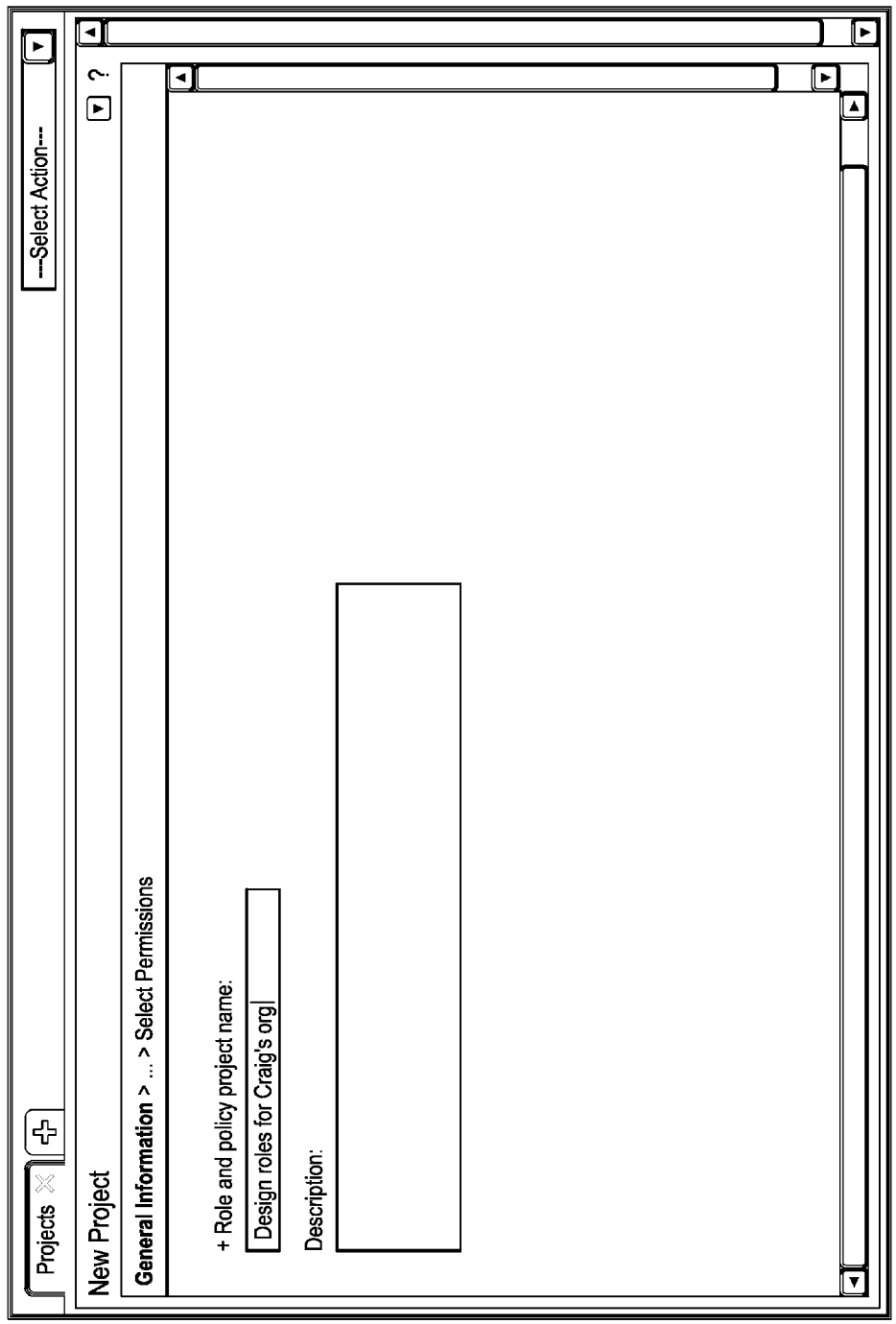
FIGS. 4A-4F are example diagrams of user interfaces that may be generated by the various components of the role engineering mechanism for defining a scope for role engineering/modeling in accordance with one illustrative embodiment.

FIG. 4A is an example user interface display of a user interface for initiating the creation of a new role engineering project. As shown in FIG. 4A, fields are provided for specifying a name of the role engineering project and a description of the role engineering project. This is an example of an initial graphical user interface a user may be presented with when the user logs onto the role engineering mechanism of the illustrative embodiment and selects an option to create a new role engineering project.

Figure 4B:
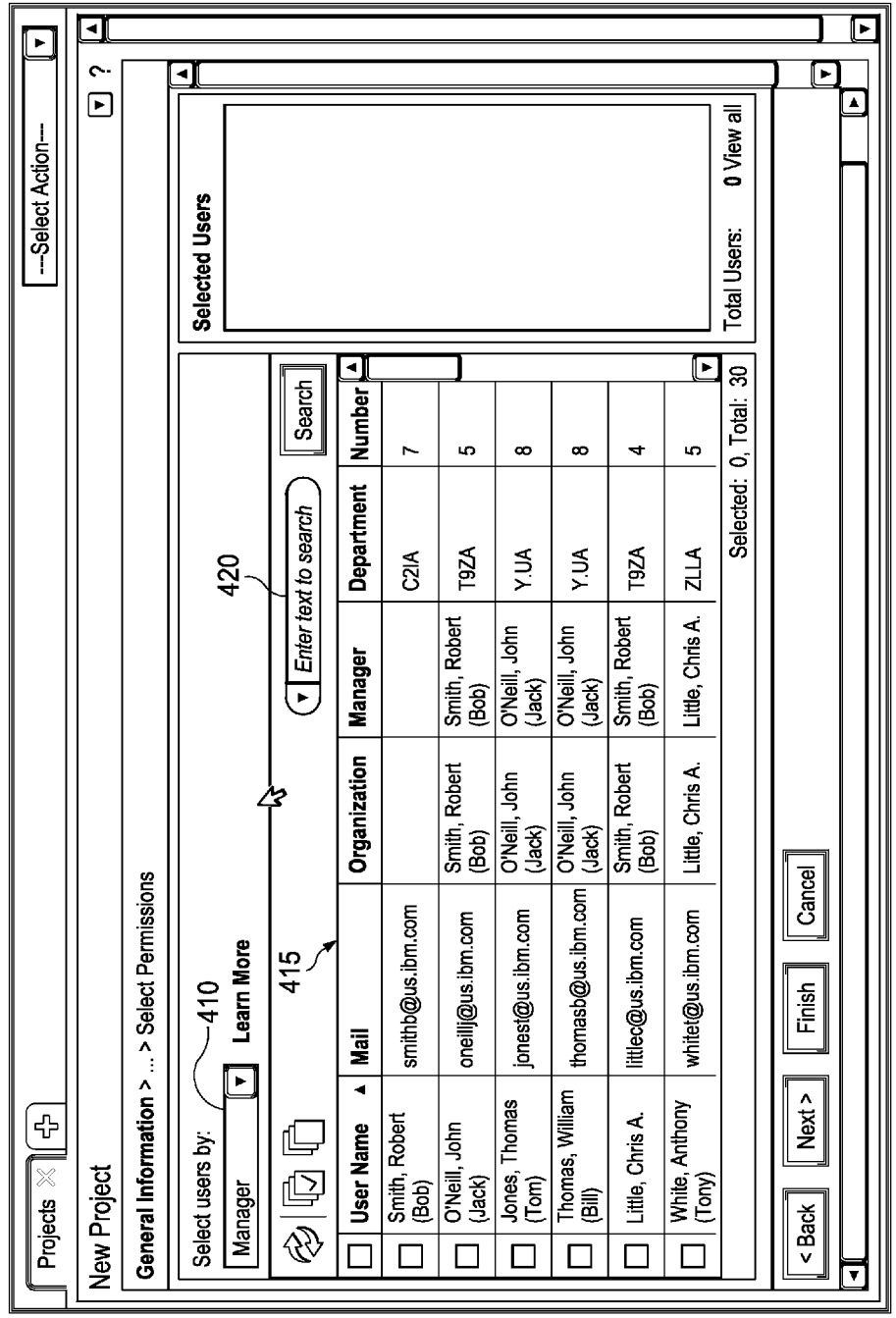

Once the role engineering project is created, a user interface may be generated and output to the user for selecting the first set of context attributes to specify the particular data objects of interest to the user for defining roles in accordance with the role engineering project. One way to start this process of identifying context attributes is to display a listing of employees in accordance with selection criteria. As shown in FIG. 4B, a field 410 is provided for inputting or selecting a particular employee designation, such as manager, supervisor, clerk, etc. In this case, the user has selected the employee designation of "manager" and as a result, the user identity objects having an employee designation of "manager" are displayed in a search results portion 415 of the graphical user interface. That is, in response to the user selecting the employee designation "manager" as a context attribute of an initial filter of the data objects, a search is performed of user identity objects to find the ones that have an employee designation of "manager" and then displays the context attributes corresponding to the user identity objects found as a result of the search. The search is essentially an application of the filter criteria, i.e. the selected context attributes that are of interest, being used to compare against context attributes of the data objects to identify data objects having matching context attributes, with those data objects having matching context attributes being returned as a subset of data objects in the search results. It should be appreciated that the search criteria specified may be other types of search criteria, or combinations of search criteria other than employee designation. For example, other search criteria may be specified in search field 420 to further narrow the search of data objects of interest to the user.

Figure 4C:
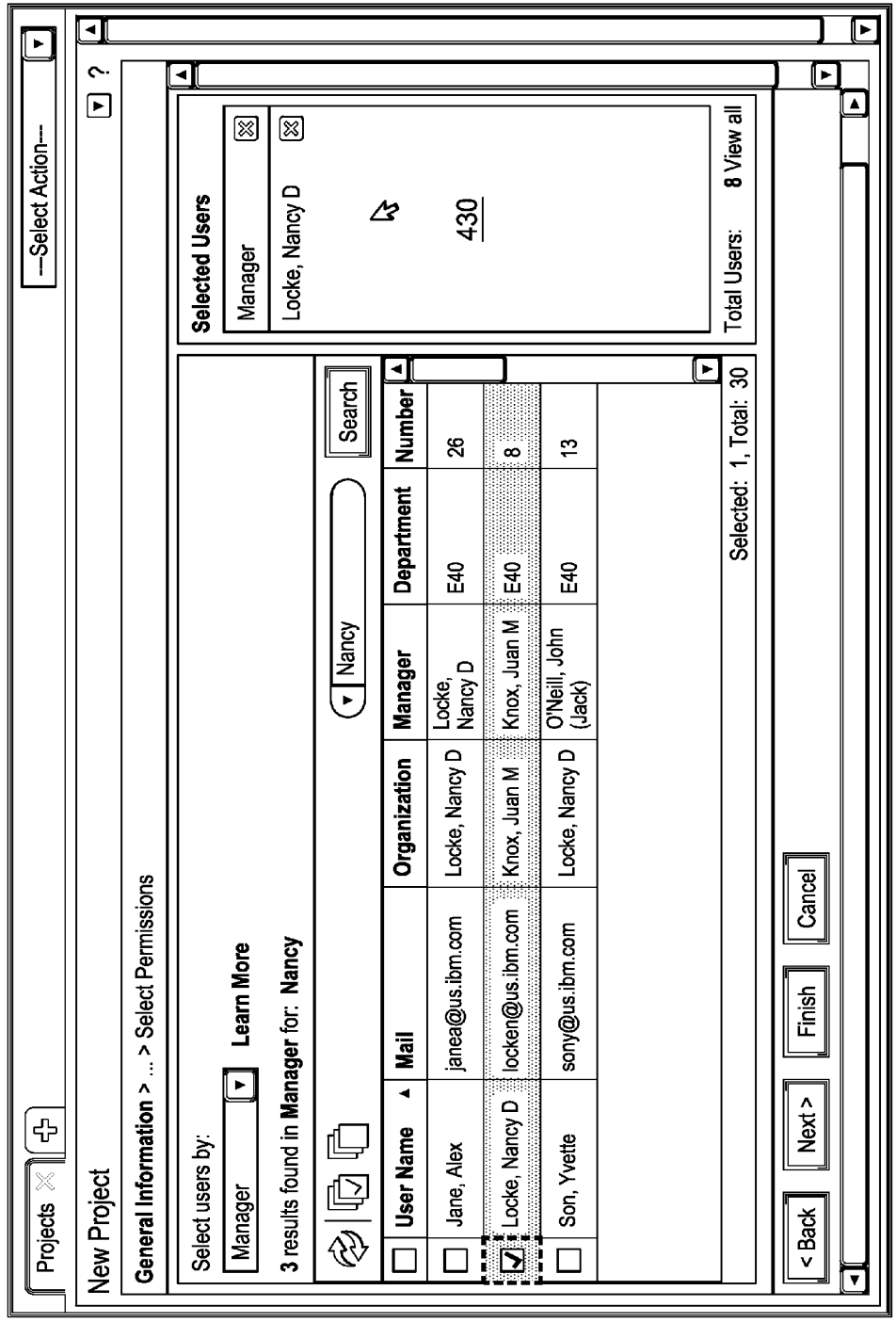
Figure 4D:
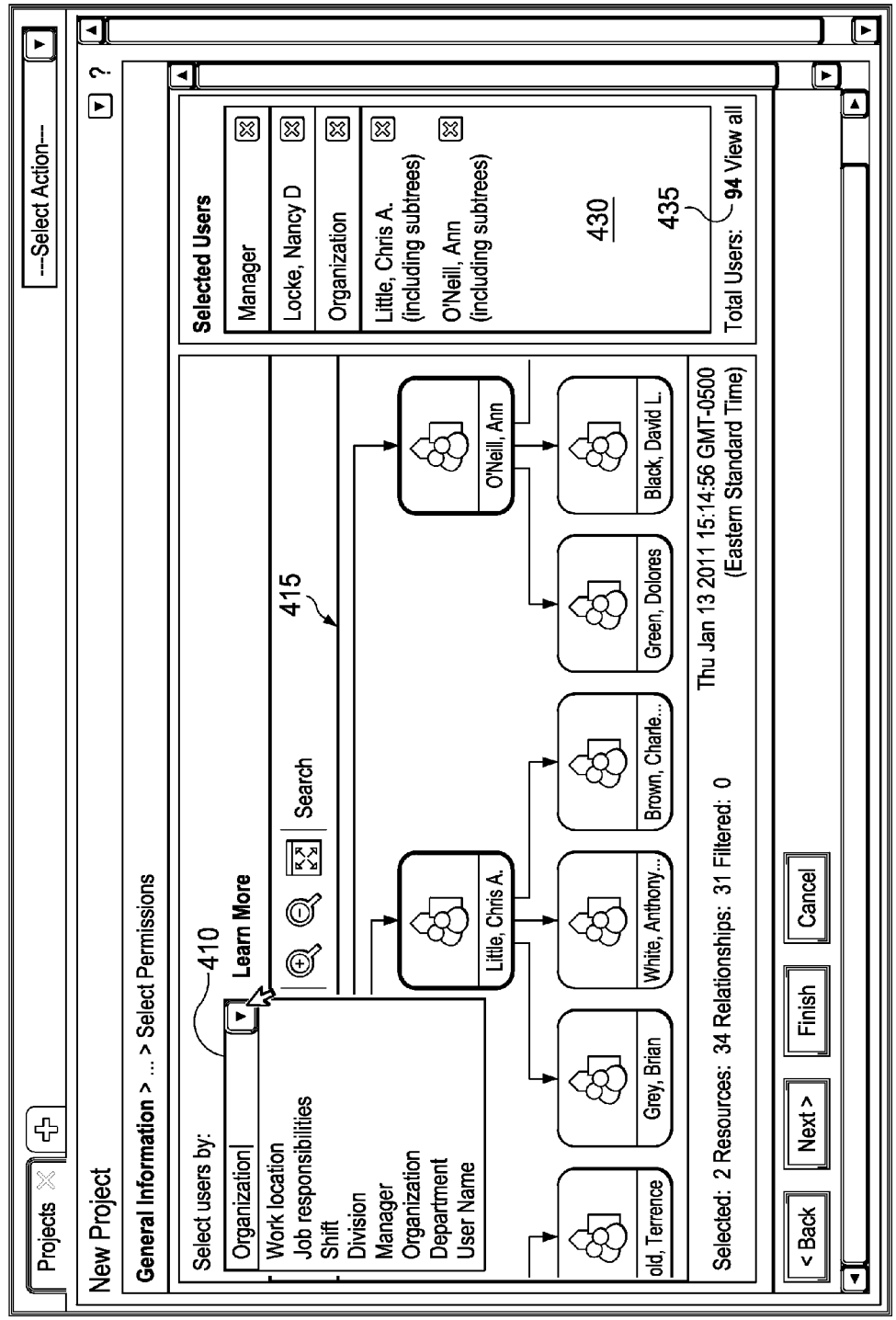

As shown in FIG. 4C, a user may specify that the user is interested in the employees associated with manager Nancy Locke and as a result, a filter for employees managed by Nancy Locke is added to the project scope filter set 430. In addition, assume that the user wishes to include some organizations including Ann O'Neill organization of doctors and Chris Little's organization of nurses and physician assistants. As a result, as shown in FIG. 4D, the user may select, instead of "manager", a search criteria (or filter criteria) of "organization" in field 410. It should be noted that as shown in FIG. 4D, there may be many different search criteria specified in field 410 including "job responsibilities", "shift", "division", "department", "user name", etc. These context attributes may be based on the context attributes used by the organization in defining the user identity data objects, for example. The selection of the "organization" search criteria results in an organizational chart of the organization being generated in the portion 415. A user may select objects in the organization chart representing organizations that the user is interested in including in the search filters for the role engineering project. In this case, the user selects the object corresponding to Chris Little and Ann O'Neill.

As a result of this selection, the project scope of the role engineering project now includes hospital department heads, doctors, nurses, and physician assistants associated with manager Nancy Locke, Chris Little, and Ann O'Neill. This corresponds to 94 users in this example as specified by the total users identifier 435. The user could go on to expand or refine the project scope by including considerations for location, certifications of employees, or any other context attributes of interest.

Figure 4E:
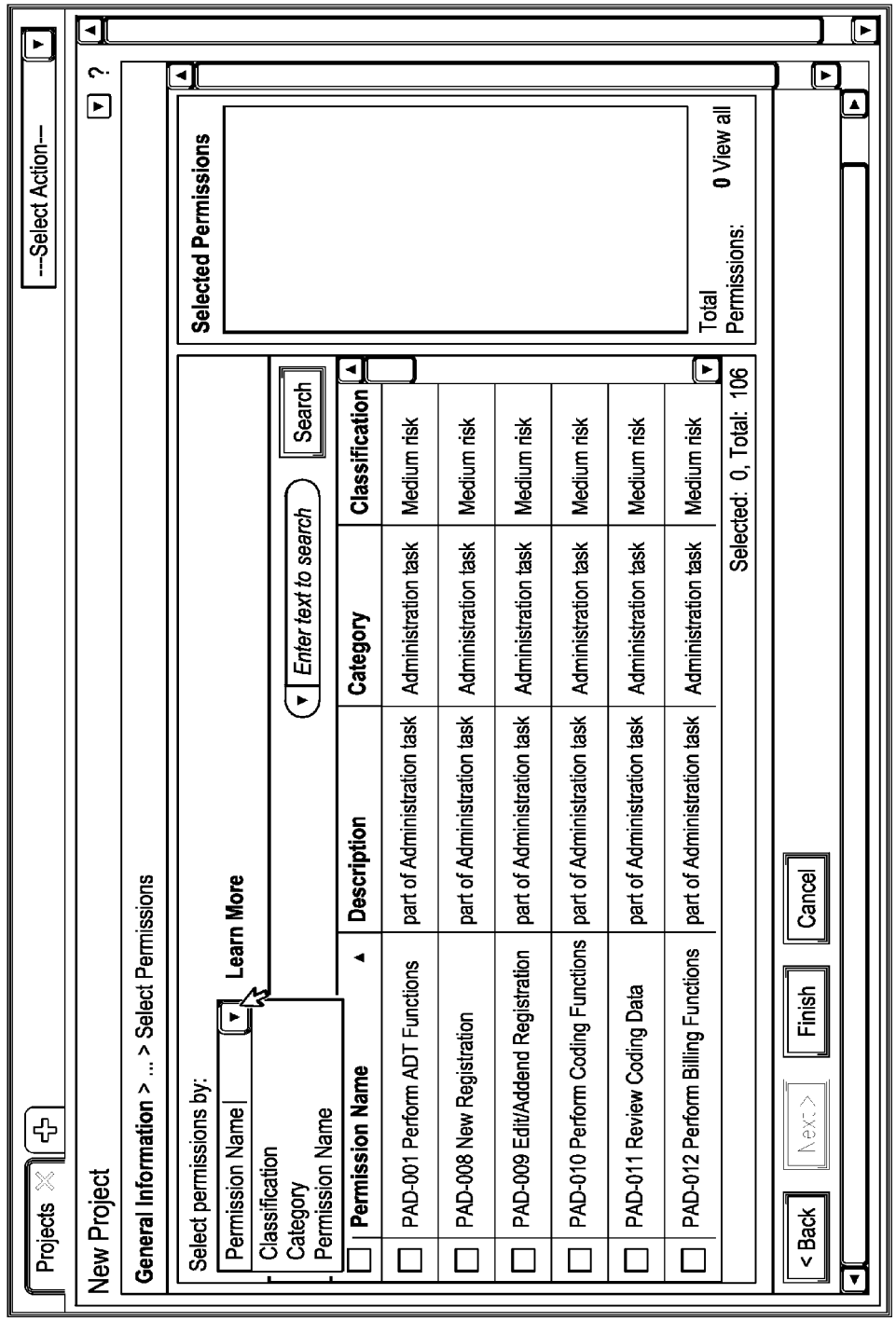

Having selected the context attributes of interest for selection of user identity objects, the user may then turn to the various applications that may be considered as part of the role engineering project. For example, applications may be broken down by the actions an employee can perform on a resource. This may be represented by a permission. FIG. 4E illustrates a user interface generated in response to the selection of a search criteria for searching for permissions and permissions by permission name.

Figure 4F:
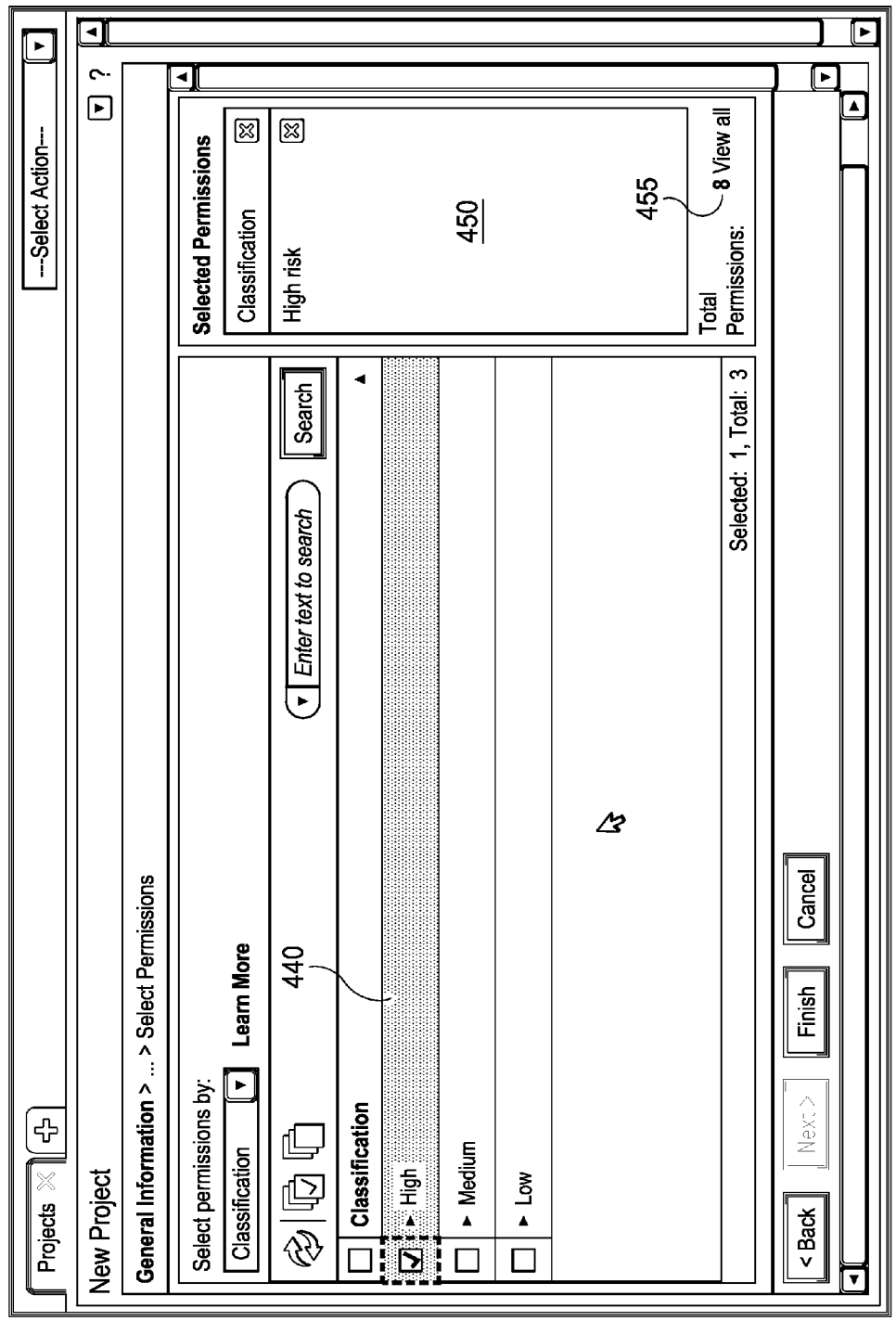

These permissions may be further filtered according to other context attributes of the permissions, such as a risk level or the like. In the example shown in FIGS. 4A-4F, the organization may classify each application with a risk level of high (e.g., for applications containing patient sensitive information), medium (e.g., operating room scheduling), and low (e.g., company portal containing upcoming events and news announcements). As shown in FIG. 4F, a user interface may be provided for specifying which permissions are of interest to the role engineering project according to risk level of the application. In the depicted example, the user selects the "high" risk level for applications in portion 440 of the user interface which causes this filter to be added to the permissions filter set 450, which in turn results in a total number of permissions being considered of 8 permissions 455.

At this point, the role engineering project now has a targeted set of user identity data objects and a specific set of high risk permission data objects to be considered. Thus, the illustrative embodiments provide mechanisms for defining the scope of a role engineering project by specifying context attributes of interest to the role engineering project that are then used as filter criteria against a superset of data objects to thereby identify one or more subsets of data objects that fall within the scope of the role engineering project. An example of such a filter and filter criteria may include, for example, all employees who work at the Seattle Health Care Clinic, who are Registered or Licensed Practical Nurses, and who have completed training certification level 3. Another example of such a filter and filter criteria may include all permissions of a PharmacyWeb application that are classified as a medium risk or higher and that are used by the business process "pharmacy ordering task."

The resulting set of user identity data objects identified via the specification and application of these filtering criteria is more manageable than the total set of data objects that could be considered. Based on this targeted subset of data objects, the user is able to develop the roles for the project using the data mining and analytical tools of the role management engine 370 in FIG. 3. As the user works on the role engineering project, the filters established by the role engineering scoping engine insulate the user from organizational and application changes, allowing for the resulting role modeling to be relevant to the organization.

The filters, associated context attribute filter criteria, resulting subsets of data objects, and the like may be stored in associated with one or more data structures defining the role engineering project so that they be retrieved and used/modified by the role management engine 370, used to start a new similar role engineering project, or copied into other role engineering projects, or the like. The role engineering project stores the filter criteria as these one or more data structures and either changes the data objects in the role engineering project, or changes pointers in the role engineering project that refer to the data objects. Making a copy of the role engineering project will cause a copy of the filter data structure, the data objects in the role engineering project, and/or any references to the data objects in the role engineering project, to be generated.

The user can expand the scope of the role engineering project to include more employees, more applications, or the like, by changing the project scope. This allows for an iterative approach to role engineering. Moreover, the role engineering project may be combined or merged with other role engineering projects. For example, in order to merge two or more role engineering projects, the filter data structures of the role engineering projects may be merged by logically ANDing or ORing, depending upon the particular implementation, the filter criteria (i.e. the selected context attributes), to create a new filter data structure that contains a superset of filter criteria that is a combination of the filter criteria of the merged role engineering projects. Data objects and/or references to data objects in the merged role engineering projects, as well as roles defined as part of the role engineering projects, may be combined in a similar manner using logical ANDing or ORing to create a superset of such data objects and/or references and roles.

In addition to merging of role engineering projects, the mechanisms of the illustrative embodiments further support the splitting of role engineering projects. Such splitting may be performed, for example, for ease of management of the role engineering projects, for organizational changes, or the like. The role engineering project and roles may be separated into new role engineering projects and sets of roles by splitting the filter criteria along specified lines. For example, a role engineering project with a filter that applies to all West Coast and all East Coast Pharmacists may be split into two role engineering projects, one for the West Coast and one for the East Coast Pharmacists by specifying the context attributes to be included in each of these "sub-projects." The splitting process may result in two separate role engineering projects with subsets of data objects, roles, and filter criteria.

The project scoping also reduces modeling noise from employees and applications with similar attribute values that do not meet the specific role engineering project context attribute criteria specified by the user. That is, noise occurs when too many data objects are included in a role engineering project, where some of the data objects have considerably less affinity to the majority of data objects selected. For example, in creating a role engineering project for a new security product software team, the filter criteria may include the context attributes specifying the development, test, and architecture departments of an organization. However, the architecture department may be a cross matrix organization with employees assigned to many software products. Many of the employees of the architecture department do not have affinity with the new security software project. A more specific filter may be generated using the mechanisms of the illustrative embodiments that will include the development department, test department and only employees from the architecture department that have a job responsibility of "security architect." This reduces the "noise" of the other architects who should not be considered when creating roles for the new security product team.

Furthermore, the mechanisms of the illustrative embodiments allow multiple users to work on role engineering projects in parallel. For example, another user can be working on a HIPPA influenced model for another department in the same or different hospital or a user concerned with financial regulation, such as SOX, models access to the financial applications. The collection of role engineering projects may be aggregated over time such that a role model emerges for the entire organization across many resources. However, individual role engineering projects can remain small enough in scope to be maintainable by a department head, business application owner, or other type of business owner.

Figure 5:
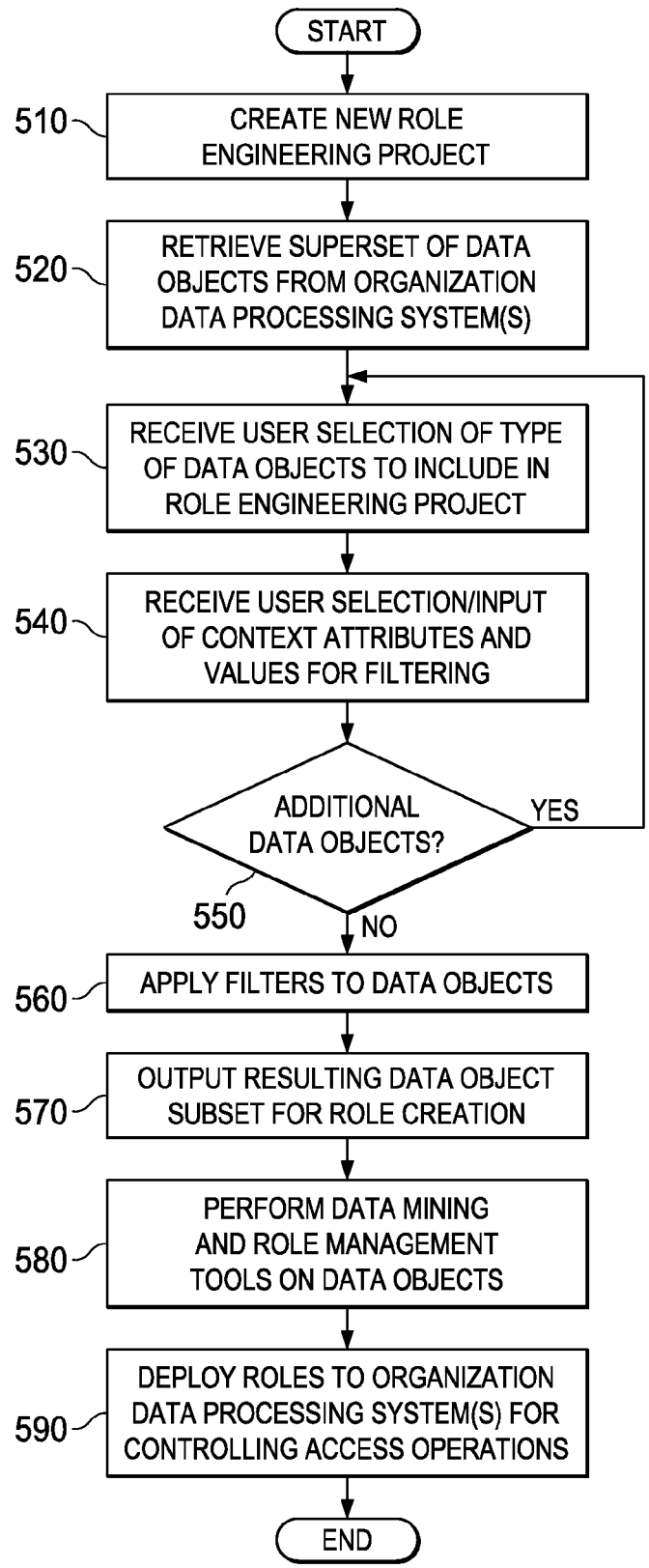
FIG. 5 is an example flowchart outlining an example operation for performing role engineering scoping in accordance with one illustrative embodiment.

FIG. 5 is an example flowchart outlining an example operation for performing role engineering scoping in accordance with one illustrative embodiment. As shown in FIG. 5, the operation starts with the user creating a new role engineering project (step 510). A superset of data objects is then retrieved from the organizational data processing system(s) (step 520). A user selection of a type of data objects to include in the role engineering project is received (step 530). Corresponding initial search context attributes and associated values for the filtering of the selected type of data objects is received from the user (step 540). A determination is made as to whether additional data object types are to be included for consideration in the role engineering project (step 550). If so, the operation returns to step 530. If not, then the filters corresponding to the search context attributes and their associated values are applied to the corresponding data objects of the data object types (step 560). The resulting data objects are displayed in one or more user interfaces such that they may be selected and combined together to form combinations of permissions and targets of these permissions to define one or more roles (step 570).

From the display of the one or more user interfaces, data mining and role management tools operate to define one or more roles (step 580). The resulting roles are deployed to the organization's data processing system(s) for controlling accesses to resources of the organization's data processing system(s) by other resources and users either inside or outside the organization (step 590). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer readable storage medium having a computer readable program stored therein, wherein the computer readable program, when executed on a data processing system, causes the data processing system to:
   receive a plurality of data objects representing one or more user identities, permissions, and resources of an organization computing system;
   receive one or more filter criteria for filtering the plurality of data objects to generate a subset of data objects for consideration during a role engineering project, wherein the one or more filter criteria specify a scope of the role engineering project, and wherein the role engineering project comprises generating one or more security roles that do not previously exist in an organization computing system;
   apply the one or more filter criteria to generate the subset of data objects;
   perform role engineering project operations on the subset of data objects to generate the one or more security roles;
   deploy the one or more security roles to the organization computing system to control access operations targeting resources of the organization computing system; and at least one of:
   merge at least one of the one or more filter criteria, the subset of data objects, or the one or more security roles of the role engineering project with at least one of filter criteria, data objects, or security roles of another role engineering project; or
   split the at least one of the one or more filter criteria, the subset of data objects, or the one or more security roles of the role engineering project into two or more subprojects of the role engineering project.

2. The computer program product of claim 1, wherein the computer readable program causes the data processing system to receive one or more filter criteria by:
   outputting a user interface to a user for selecting the one or more filter criteria; and
   receiving user input via the user interface identifying the one or more filter criteria to be used to select data objects for inclusion in the role engineering project.

3. The computer program product of claim 2, wherein the one or more filter criteria comprise one or more attributes of the data objects.

4. The computer program product of claim 3, wherein the one or more attributes of the data objects comprises different attributes for different data object types, wherein the different data object types comprise data objects for user identities, data objects for permissions, and data objects for resources.

5. The computer program product of claim 3, wherein the one or more attributes of the data objects comprises at least one of attributes specifying a business function of a data object, attributes associated with a business policy characteristic of the data object, or attributes associated with an information technology characteristic of the data object.

6. The computer program product of claim 2, wherein:
   the user interface outputs a representation of the plurality of data objects, provides a user input mechanism for selecting at least one attribute of the plurality of data objects for filtering the representation of the plurality of data objects, and provides a portion of the user interface where a representation of the subset of data objects selected based on the selected at least one attribute of the plurality of data objects is output.

7. The computer program product of claim 1, wherein the computer readable program causes the data processing system to perform role engineering project operations to generate one or more security roles by receiving user selections of at least one user identity data object, at least one resource data object, and at least one permission data object to correlate with one another in a defined security role.

8. The computer program product of claim 1, wherein the computer readable program further causes the data processing system to:

receive user input to modify the scope of the role engineering project, wherein the user input to modify the scope comprises at least one of a selection of a new filter criteria to include in the one or more filter criteria or removal of a filter criteria from the one or more filter criteria specifying the scope of the role engineering project.

9. An apparatus, comprising:

a processor; and a memory coupled to the processor, wherein the memory comprises instructions which, when executed by the processor, cause the processor to:

receive a plurality of data objects representing one or more user identities, permissions, and resources of an organization computing system;

receive one or more filter criteria for filtering the plurality of data objects to generate a subset of data objects for consideration during a role engineering project, wherein the one or more filter criteria specify a scope of the role engineering project, and wherein the role engineering project comprises generating one or more security roles that do not previously exist in an organization computing system;

apply the one or more filter criteria to generate the subset of data objects;

perform role engineering project operations on the subset of data objects to generate the one or more security roles; and deploy the one or more security roles to the organization computing system to control access operations targeting resources of the organization computing system; and at least one of:

merge at least one of the one or more filter criteria, the subset of data objects, or the one or more security roles of the role engineering project with at least one of filter criteria, data objects, or security roles of another role engineering project; or split the at least one of the one or more filter criteria, the subset of data objects, or the one or more security roles of the role engineering project into two or more subprojects of the role engineering project.

10. The apparatus of claim 9, wherein the instructions cause the processor to receive one or more filter criteria by:

outputting a user interface to a user for selecting the one or more filter criteria; and receiving user input via the user interface identifying the one or more filter criteria to be used to select data objects for inclusion in the role engineering project.

11. The apparatus of claim 10, wherein the one or more filter criteria comprise one or more attributes of the data objects.

12. The apparatus of claim 11, wherein the one or more attributes of the data objects comprises different attributes for different data object types, wherein the different data object types comprise data objects for user identities, data objects for permissions, and data objects for resources.

13. The apparatus of claim 11, wherein the one or more attributes of the data objects comprises at least one of attributes specifying a business function of a data object, attributes associated with a business policy characteristic of the data object, or attributes associated with an information technology characteristic of the data object.

14. The apparatus of claim 10, wherein:

the user interface outputs a representation of the plurality of data objects, provides a user input mechanism for selecting at least one attribute of the plurality of data objects for filtering the representation of the plurality of data objects, and provides a portion of the user interface where a representation of the subset of data objects selected based on the selected at least one attribute of the plurality of data objects is output.

15. The apparatus of claim 9, wherein the instructions cause the processor to perform role engineering project operations to generate one or more security roles by receiving user selections of at least one user identity data object, at least one resource data object, and at least one permission data object to correlate with one another in a defined security role.

16. The apparatus of claim 9, wherein the instructions further cause the processor to:

receive user input to modify the scope of the role engineering project, wherein the user input to modify the scope comprises at least one of a selection of a new filter criteria to include in the one or more filter criteria or removal of a filter criteria from the one or more filter criteria specifying the scope of the role engineering project.

* * * * *